United States Patent [19]
Struger et al.

[11] 3,745,546
[45] July 10, 1973

[54] CONTROLLER OUTPUT CIRCUIT

[75] Inventors: Odo J. Struger, Milwaukee; Jay M. Erdman, South Milwaukee, both of Wis.

[73] Assignee: Allen-Bradley Company, Milwaukee, Wis.

[22] Filed: June 7, 1971

[21] Appl. No.: 150,487

[52] U.S. Cl. ............................. 340/250, 337/266
[51] Int. Cl. ............................................. G08b 21/00
[58] Field of Search................ 340/250; 317/40 A, 317/335 C, 41; 337/79, 266, 241, 242, 332, 376

[56] References Cited
UNITED STATES PATENTS

| | | | |
|---|---|---|---|
| 2,697,216 | 12/1954 | Lee | 340/250 X |
| 3,575,637 | 4/1971 | Krieger et al. | 317/41 X |
| 3,489,927 | 1/1970 | Kellet, Jr. et al. | 317/335 C |
| 3,031,653 | 4/1962 | Bowar et al. | 340/250 |

*Primary Examiner*—John W. Caldwell
*Assistant Examiner*—Daniel Myer
*Attorney*—Barry E. Sammons and Arthur H. Seidel

[57] ABSTRACT

An output drive circuit for a programmable controller includes a triac connected to an a-c power supply in series with a fuse and the controlled external load. The fuse is shunted by a neon indicator lamp and the triac is shunted by a high impedance path including a resistor and capacitor. When the fuse blows and the triac is turned off the the controller, current flows through the neon bulb to indicate the faulty fuse.

5 Claims, 1 Drawing Figure

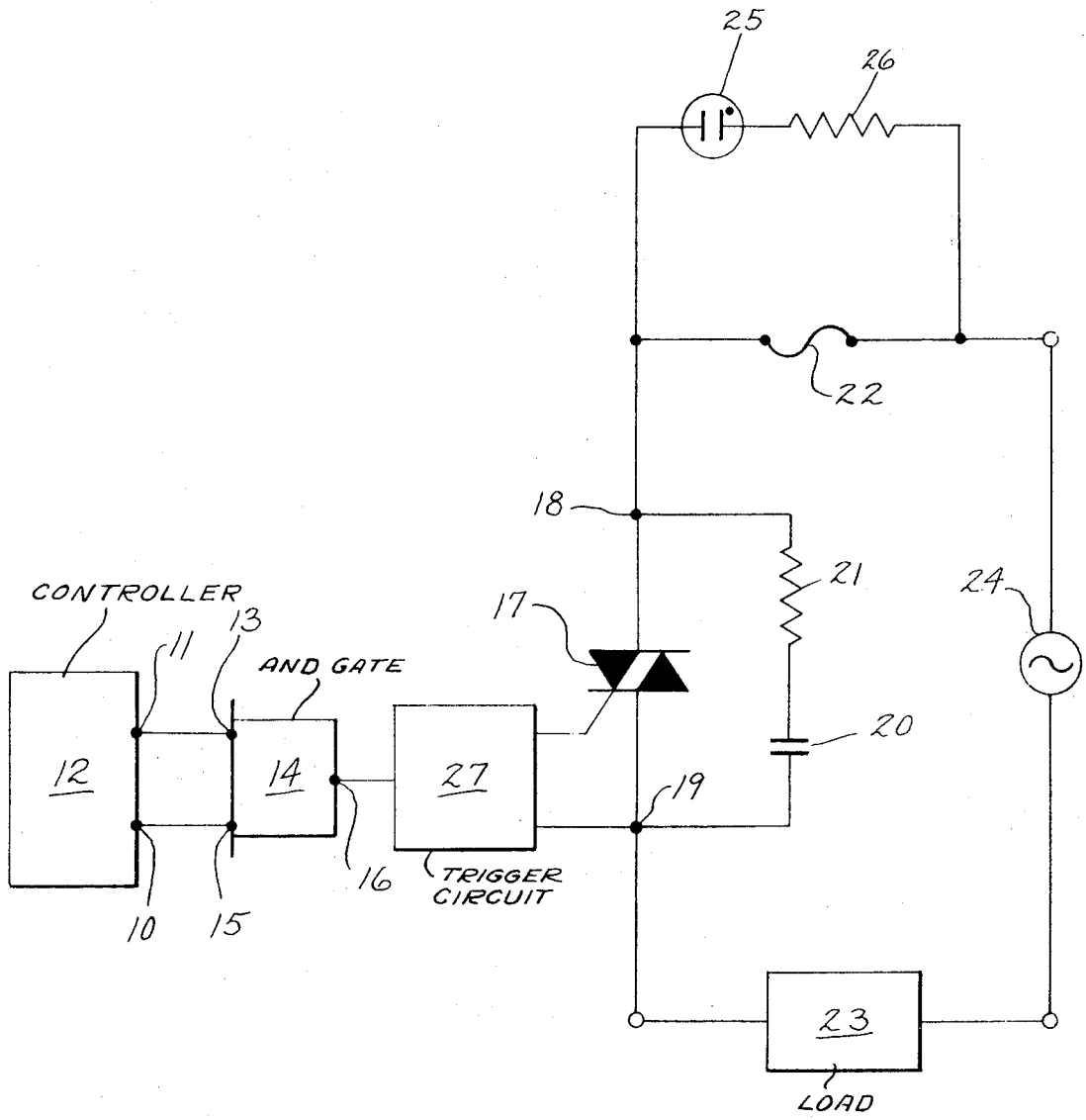

CONTROLLER OUTPUT CIRCUIT

BACKGROUND OF THE INVENTION

The field of the invention is output drive circuits for use in controllers and particularly for use in programmable controllers such as that described in the co-pending U.S. Pat. application Ser. No. 137,923 of Wave Kiffmeyer entitled "Programmable Matrix Controller" filed Apr. 27, 1971.

Such controllers are connected to sense the condition of various input devices, such as limit switches, photocells, push buttons, and solenoids, and automatically sequence output devices such as motor starters, lights, control valves and solenoids in accordance with instructions contained in a stored program. Such a controller might, for example, control the movement of a part along an assembly line and control the various machines in that line to machine the part.

Although the number of input and output devices vary considerably depending upon the control function to be performed, the output devices, and hence output drive circuits, may number in the hundreds. The output drive circuits are located on printed circuit boards and the necessary number of such boards are plugged into the controller and wired to the devices which they control.

For safety reasons, the controller is adapted to turn off all controlled devices when a malfunction occurs in any one of them, and due to the large number of output devices and associated output drive circuits, trouble-shooting such malfunctions becomes very difficult. When the maintenance crew examines a controller which has shut down, it is faced with the problem of determining which one of possibly hundreds of output devices or drive circuits has malfunctioned. Trouble-shooting the problem can be very time consuming and results in a considerable loss in production by the machine or machines being controlled.

SUMMARY OF THE INVENTION

The present invention comprises an output drive circuit for a controller which visually indicates a malfunction in the device to which it is attached when the controller is shut down. More specifically, the invention comprises: an electronic switch connected in circuit with a fuse and with the device to be controlled, high impedance means shunting the electronic switch and in circuit with the fuse and controlled device, and an indicator lamp connected to shunt the fuse. The electronic switch is actuated by the controller to conduct current through the fuse to the external device. When a malfunction occurs blowing the fuse, the controller immediately shuts down, turning off the electronic switch. A small current continues to flow through the indicator light and high impedance means sufficient in amplitude to illuminate the lamp and indicate the faulty circuit.

An object of the invention is to provide a means of indicating a malfunction in any one of a number of controller output drive circuits, which means requires a minimal amount of additional hardware to each output drive circuit.

Another object of the invention is to provide a means of indicating a malfunction in an output drive circuit of a controller when the electronic switch device is turned off by the controller. The high impedance means shunting the electronic switch provides a conductive path for current sufficient to illuminate the indicator lamp when the fuse is blown. This small amount of current is insufficient to cause further damage to the malfunctioning controlled device.

The foregoing and other objects and advantages of the invention will appear from the following description. In the description reference is made to the accompanying drawing which forms a part hereof, and in which there is shown by way of illustration a preferred embodiment of the invention. The invention may be employed in many different embodiments, and reference is made to the claims herein for interpreting the breadth of the invention.

BRIEF DESCRIPTION OF THE DRAWING

FIG. 1 is an electrical schematic diagram of a controller output drive circuit incorporating the present invention.

DESCRIPTION OF THE PREFERRED EMBODIMENT

Referring to FIG. 1, an output drive circuit which embodies the present invention is shown connected to output terminals 10 and 11 of a controller 12. As discussed above, the controller 12 typically contains a large number of output drive circuits like that shown in FIG. 1, each output drive circuit being contained on a printed circuit board and the boards being arranged in banks. Each output drive circuit is connected to the controller to receive both an activate signal and a disabling signal. An activate signal is generated by the controller 12 when the external device to which a particular output drive circuit is attached is to be turned on. The disabling signal is generated by the controller 12 to turn off all the output drive circuits when a malfunction occurs in any one of the controlled devices.

Referring to FIG. 1, the output terminal 11 of the controller is connected to a first input terminal 13 of an AND gate 14 and the controller output terminal 10 is connected to a second input terminal 15 on the AND gate 14. The AND gate 14 is a commercially available logic gate having and output terminal 16 which remains at a logic low until logic highs are applied to both of its input terminals 13 and 15. The outpu terminal 16 of the AND gate 14 is connected through a trigger circuit 27 to the gate terminal of a triac 17. The triac 17 is a commercially available electronic switch which coducts alternating current when triggered by a signal applied to its gate terminal by the trigger circuit 27. The trigger circuit 27 may be any one of a number of such circuits known to those skilled in the art. In the instant case, when the output terminal 16 of the AND gate 14 goes high, the triac 17 is triggered into conduction by the trigger circuit 27. When the output term1nal 16 of the AND gate 14 goes low, however, the triac 17 commutates, or turns off when the alternating load current which it conducts passes through zero.

The triac 17 has two load current carrying terminals 18 and 19 which are connected to a high impedance branch comprised of a capacitor 20 and series connected damping resistor 21. The high impedance path shunts the triac and is a commonly used arrangement in triac circuits controlling inductive type loads. In such inductive circuits, the current lags the voltage, and the capacitor 20 is connected to insure commutation of the triac 17 when the output terminal 16 of the AND gate 14 goes low. The damping resistor 21 is added to prevent "ringing" between the inductive load and the capacitor 20. A typical value for the capacitor 20 is 0.1 mfd. and a typical value for the damping resistor 21 is 100 ohms. Although the high impedance path around the triac 17 is common for the purpose of insuring commutation of the triac 17, it will be seen from the discussion below that this high impedance path provides an entirely different function in the operation of the circuit of the present invention.

The triac 17 is connected in series with both a fuse 22 and a load 23 to an a-c power source 24. A neon indicator lamp 25 is connected in series with a resistor 26 to shunt the fuse 22. The value of the fuse 22 is chosen to protect the triac 17 and the load 23. The neon type indicator lamp 25 is chosen because of its low conduction current when illuminated. Physically, the indicator lamp 25 is located on the printed circuit board to which the output drive circuit is attached and in a position readily visible to maintenance personnel.

Under normal operating conditions, the controller output terminal 10 is high and activate signals are generated at the output terminal 11 to actuate the triac 17. Thus, when the output terminal 11 is high, the output 16 of the AND gate 14 is high and the triac 17 is triggered to conduct alternating current from the a-c power source 24, through the fuse 22 to the load 23. If a malfunction occurs in the controller 12, or one of its other output drive circuits, a disabling signal is generated at the controller output terminal 10. This disabling signal drives the AND gate input terminal 15 low, causing its output terminal 16 to go low and thus turn off the triac 17. A small trickle current continues to flow through the fuse 22, damping resistor 21, capacitor 20 and load 23, however, because of the high impedance of capacitor 20, this trickle current is not sufficient to operate the load 23. Also, because the fuse 22 has a low impedance, an insignificant voltage drop is developed across it by this trickle current and the indicator lamp 25 is not illuminated.

If, on the other hand, a malfunction occurs in the load device 23 causing an overload current to flow in the output drive circuit, fuse 22 is opened and the controller 12 shuts down by generating a disabling signal at the output terminal 10. Trickle current again continues to flow through the damping resistor 21 and capacitor 20, however, this current now flows through, and causes the indicator lamp 25 to illuminate. Thus, the source of the malfunction which caused the controller 12 to shut down is immediately identified by the illuminated indicator lamp 25.

It should be apparent to those skilled in the art that numerous types of fuses 22 can be used in the output drive circuit, and that electronic switching devices other than triacs can be used. or example, switching transistors, SCR's, or relays can be substituted for the triac 17 to control current flow to the load 23. Also, the high impedance path around the electronic switching device may be varied to accommodate the particular switching device and the power source used. For example if a d-c power supply is used in combination with a switching transistor, a resistor of high value could be substituted for the daming resistor 21 and capacitor 20. Also, in such a case the high impedance path can also shunt the load 23, thus providing indication even when the load open circuits due to the overload current. The high impedance means in the preferred embodiment shown serves a dual purpose requiring that it be connected directly to the triac terminals 18 and 19, however, absent this constraint it may be connected to shunt both the triac 17 and load 23. pg,6

We claim:

1. In an output drive circuit for a controller which is connectable to a load to supply current thereto, the combination comprising:
   an electronic switch having an input terminal connected to the controller and a pair of load current carrying terminals connected to conduct load current to said load when an actuate signal is received from said controller;
   a fuse connected in series with said electronic switch to conduct said load current;
   high impedance means connected in shunt relation to said electronic switch to conduct a small amount of said load current when said electronic switch is non-conductive; and
   an indicator lamp connected in shunt relation with said fuse;
   wherein the high impedance means conducts sufficient current to illuminate said indicator lamp when said electronic switch is non-conductive and said fuse is open circuited.

2. The output drive circuit of claim 1, which includes a logic gate having an input terminal connected to the controller and an output terminal conneted to said electronic switch input terminal, said logic gate being operable to prevent application of the actuate signal to said electronic switch when a disabling signal is received at said gate input terminal from said controller.

3. The output drive circuit of claim 1 wherein said electronic switch is a triac and said high impedance means is a series connected resistor and capacitor connected to said load current carrying terminals.

4. In a controller having a plurality of output drive circuits, each of said output drive circuits containing an electronic switch having a control terminal connected for operation by said controller, and a pair of load current carrying terminals connected to conduct load current to an external load connected to said controller, the improvement in said output drive circuits comprising:
   a fuse connected in series with said electronic switch to conduct load current;
   high impedance means connected in shunt relation with said electronic switch; and
   an indicator lamp connected in shunt relation with said fuse;
   wherein a trickle current flows through said high impedance means when said electronic switch is non-conductive, and said trickle current flows through said indicator lamp when said fuse is open circuited to illuminate the same and provide a visual indication when said fuse opens circuit.

5. A circuit as recited in claim 4 in which a logic gate is connected to the control terminal of said electronic switch and said logic gate includes an input terminal connected to receive a disabling signal from said controller.

* * * * *